United States Patent [19]

Udall

[11] 4,233,484
[45] Nov. 11, 1980

[54] HIGH FREQUENCY CURRENT WELDING OF METAL STRIP TO A METAL PART

[75] Inventor: Humfrey N. Udall, Darien, Conn.

[73] Assignee: Thermatool Corp., Stamford, Conn.

[21] Appl. No.: 967,112

[22] Filed: Dec. 7, 1978

[51] Int. Cl.³ .............................................. B23K 31/06
[52] U.S. Cl. .................................. 219/67; 219/78.01; 219/104; 219/9.5
[58] Field of Search .................... 219/9.5, 8.5, 7.5, 6.5, 219/67, 102, 104, 105, 106, 107, 108, 101, 60.2, 61.2, 61.3, 81, 78.01, 83, 79, 86.22

[56] References Cited

U.S. PATENT DOCUMENTS

| | | | |
|---|---|---|---|
| 2,809,276 | 10/1957 | Smith | 219/107 |
| 2,938,993 | 5/1960 | Rudd | 219/8.5 X |
| 3,327,088 | 6/1967 | Rudd | 219/107 |
| 3,541,296 | 11/1970 | Rudd | 219/107 X |
| 3,610,869 | 10/1971 | Ito | 219/67 X |
| 3,619,546 | 11/1971 | Briggs | 219/67 X |

Primary Examiner—B. A. Reynolds
Assistant Examiner—Philip H. Leung
Attorney, Agent, or Firm—Brooks, Haidt, Haffner & Delahunty

[57] ABSTRACT

Method and apparatus for welding a metal part, e.g. a tube or strip, to a thin, flexible metal strip using high frequency electric currents in which the part and strip are continuously advanced to a weld point where they are pressed together. In advance of the weld point, high frequency current is supplied to the part and the strip through contacts engaging them so that portions thereof are heated to welding temperature by the time they reach the weld point. From the point of engagement of the contact with the strip or strips to the weld point the strip material is maintained in a fixed path by a rigid member against which the strip is pressed by tensioning the strip with a pad frictionally engaging the strip. If desired, the current may be fed to the contact engaging the part through a proximity conductor to increase the heating of the part relative to the strip.

19 Claims, 6 Drawing Figures

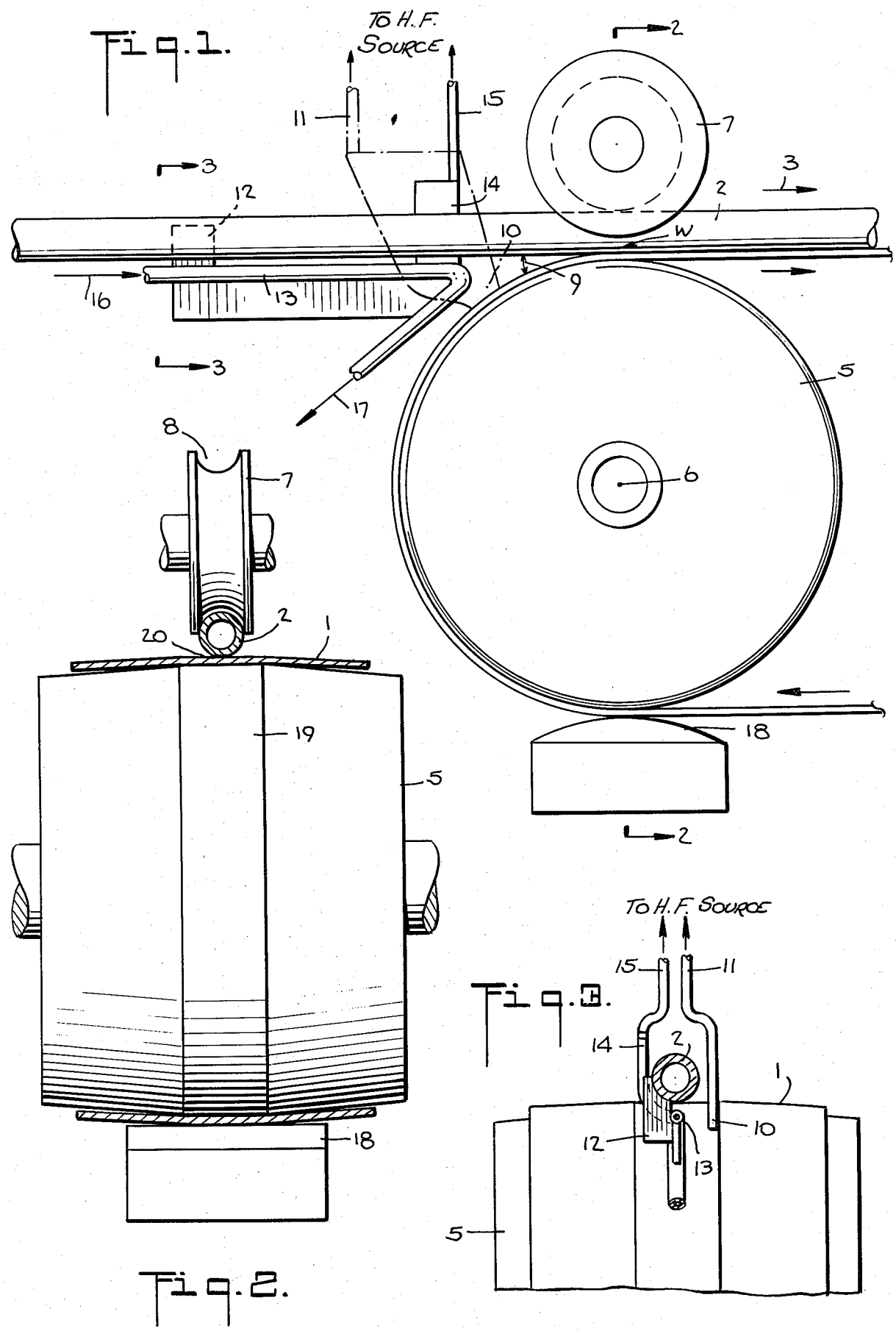

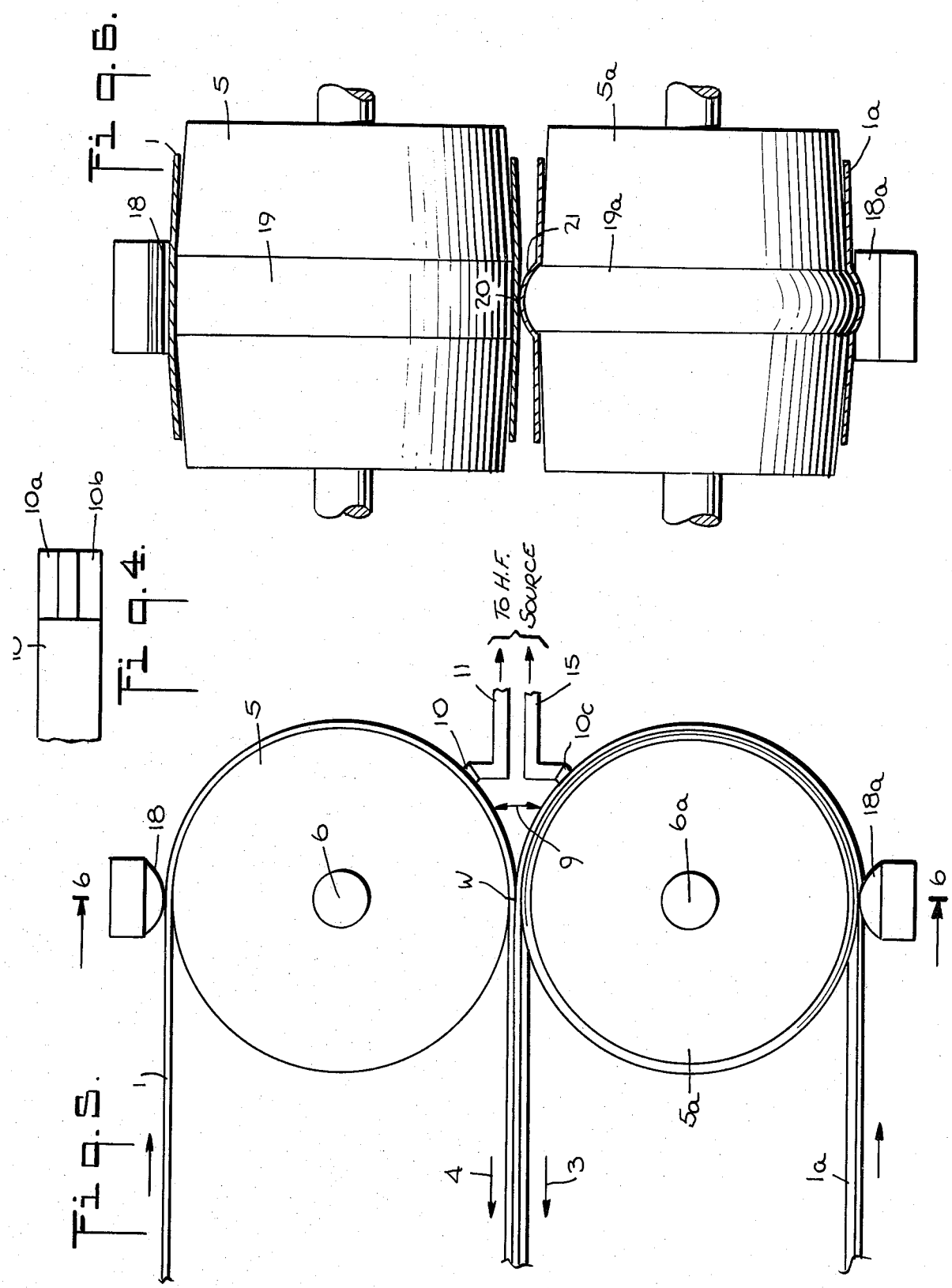

HIGH FREQUENCY CURRENT WELDING OF METAL STRIP TO A METAL PART

This invention relates to the welding of a metal part to a thin, flexible metal strip, and particularly, to the welding of a metal tube to a relatively thin and flexible metal strip or sheet, using high frequency electrical welding techniques.

The welding together of metal parts using high frequency electric currents, i.e. a frequency of 50 kHz or higher, is well known in the art. See, for example, U.S. Pat. Nos. 2,821,619 and 3,319,040 and other patents assigned to the assignee of this application. In the high frequency welding methods, the parts are moved longitudinally and continuously, at relatively high speed and in separated relation, toward a weld point, at which they are pressed together, and in advance of the weld point, they are engaged by contacts which supply high frequency electric current thereto, the magnitude and frequency of the current being such that the surface portions to be joined reach welding temperature during the time that they move from the contacts to the weld point. When the parts have different thermal masses or conductivities, such as by reason of different dimensions or materials, problems are encountered in bringing both the surface portions of the parts to be welded together to the desired welding temperature at the time they are welded together. See, for example, U.S. Pat. Nos. 3,359,402 3,513,284, and 3,541,296. However, when one of the parts is a thin, flexible strip or sheet, additional problems are encountered in obtaining a uniform weld between the strip or sheet and the other part.

The co-pending application of Wallace C. Rudd, Ser. No. 790,335, filed Apr. 25, 1977, entitled "Method of Manufacturing Heat Exchange Panels" and assigned to the assignee of this application, discloses methods and apparatus for using said high frequency electrical welding methods in the manufacture of heat exchange panels having metal strips with metal tubing welded thereto. Such methods and apparatus are entirely satisfactory when the metal tubing and the metal strip have similar thermal masses and the strip is thick enough to permit close control of the path followed by the strip between the contact engaging it and the weld point. However, when the strip is relatively thin, e.g. having a thickness in the range from 0.005–0.025 inch, problems are encountered in obtaining a uniform weld not only because it may have a thermal mass and conductivity which is low compared to the tubing, but also because undulations or variations in the path followed by the strip from the contact which engages it to the weld point cause non-uniform heating to the strip. As is known in the art, variations in the spacing between the current carrying parts as they approach the weld point cause variations in the heating of the parts because the current concentration is dependent on proximity effect which, in turn, is dependent on the spacing between the current carrying parts and the frequency of the current.

One object of the invention is to provide a uniform weld between a relatively thin and flexible metal strip or sheet and a second part, such as a metal tube, rod or strip, using the aforesaid high frequency electrical welding techniques.

In accordance with a preferred embodiment of the invention, a tube, such as a tube made of copper or aluminum, is advanced along a substantially rectilinear, or if desired, a slightly curved, path, toward the gap between a pair of pressure rolls, one roll being larger than the other and the smaller roll having a peripheral groove therein to closely embrace part of the periphery of the tube. A strip or sheet of metal (hereinafter called a strip of metal), such as copper or aluminum, which is thin relatively to the width of its face between its edges and which width is large relative to the diameter of the tube, is simultaneously advanced toward said gap with an intermediate portion of its face facing toward the tube. The spacing of the roll is such that the strip and tube are pressed together at a point (weld point) substantially on a straight line extending between the axes of the rolls, and the strip is pressed against the surface of the larger roll and subjected to tension prior to the time that it is pressed against the tube. The surface of the larger roll may be entirely cylindrical, but preferably, such surface has a peripheral cylindrical portion intermediate its ends which has an axial width at least equal to the width of the weld to be produced between the strip and the tube, and has a gradually decreasing diameter on both sides of said cylindrical portion. The larger roll may be made of metal, but since it does not have the purpose of absorbing heat from the strip, it may be made of low thermal conductivity material. A first contact engages the strip shortly in advance of the weld point and high frequency electric current is fed thereto. A second contact engages said tube at least as far from the weld point as said first contact and high frequency electric current is fed thereto through a proximity conductor which is in closely spaced relation to said tube and which extends from adjacent the first contact to said second contact. Preferably, the strip engages the surface of the larger roll approximately diametrically opposite the weld point and is pressed against the larger roll by means, such as a pad of felt or other suitable material, in sliding engagement therewith.

A second embodiment of the invention for welding a pair of thin, metal strips together along a weld line intermediate the longitudinal side edges thereof is, in its preferred form, similar to the embodiment described hereinbefore except that two strips, rather than a strip and a tube, are welded together. In this second embodiment, a first strip is fed around a roll and engaged by a first contact supplied with high frequency electric current as described in connection with the first embodiment. The second strip is similarly fed around a second roll and engaged with a second contact supplied with high frequency current, but an axially intermediate peripheral portion of the second roll extends above the remainder of the second roll so as to cause a portion of the second strip intermediate its side edges to "bulge" toward the first strip and thereby, to concentrate the current in the "bulge" and in the adjacent portion of the first strip. If desired, the first roll may be similar to the second roll so as to cause both strips to "bulge" toward each other for the same purpose.

Other objects and advantages of the present invention will be apparent from the following detailed description of the presently preferred embodiments thereof, which description should be considered in conjunction with the accompanying drawings in which:

FIG. 1 is a side elevation view of preferred embodiment of the invention for welding a tube to a strip;

FIG. 2 is an end elevation view, partly in cross-section, of the embodiment shown in FIG. 1 and is taken along the line 2—2 indicated in FIG. 1;

FIG. 3 is a fragmentary end elevation viewed partly in cross-section, of the apparatus shown in FIG. 1 and is taken along the line 3—3 indicated in FIG. 1;

FIG. 4 is an end view of a "split" contact which may be used to engage the strip;

FIG. 5 is a side elevation view of a modified form of the invention used to weld two strips together and;

FIG. 6 is an end elevation view, partly in cross-section, of the embodiment shown in FIG. 5 and is taken along the line 6—6 indicated in FIG. 5.

In the embodiment illustrated in FIGS. 1-3, a thin, flexible metal strip 1, e.g. a strip of copper or aluminum, and a metal tube 2, e.g. a copper or aluminum tube, are pulled by apparatus well known to those skilled in the art in the direction of the arrows 3 and 4 indicated in FIG. 1. The tube 2 may have various diameters but generally speaking for solar heating exchangers will have an outside diameter of approximately one inch or less. The strip 1 with which the invention is concerned will be relatively thin, i.e. a thickness of from 0.005 to 0.025 inch and normally will have a width several times the diameter of tube 2, for example, a width from 4 to 18 inches.

The strip 1 passes around a rotatable roll 5 which has an axis of rotation which is generally parallel to the upper and lower faces of the strip 1. Such roll 5 in combination with a rotatable roll 7, which has a peripheral groove 8 which embraces approximately half of the periphery tube 2, press the tube 2 and the strip 1 together at a weld point W. It is preferable that the rolls 5 and 7 be freely rotatable or "idler" rolls and it is desirable that the roll 5 not be a driving roll to avoid wrinkling or movement of the sheet 1 with respect to the surface of the roll 5 intermediate the contact 10 and the weld point W.

In the preferred embodiment of the invention, the tube 2 is advanced toward the weld point W in a substantially straight line, but it may be advanced toward the weld point along a curved line. It is, however, important for current concentration purposes that the angle 9 between the lower surface of the tube 2 and the upper surface of the strip 1 as they approach the weld point be very small.

In advance of the weld point W, the strip 1 is contacted at its upper surface by a contact 10 which slidably engages such surface of the strip 1. The contact 10 may be a single contact or it may be a "split" contact, that is it may have a pair of spaced surfaces 10a and 10b, as illustrated in FIG. 4, which engage the surface of the strip 1. The use of such a split contact decreases the current concentration at the point of engagement of the contact 10 with the strip 1. The contact 10 is connected to a high frequency source (not shown) having a current frequency of at least 50 kilohertz and preferably, a frequency of the order of 400-450 kilohertz, by way of a lead 11. Preferably, the contact 10 is water cooled in a conventional manner.

The tube 2 is engaged by a contact 12 which is spaced from the weld point W greater than the spacing of contact 10 from the weld point W. Such spacing is desirable when a part, such as the tube 2, has a relatively large thermal mass and the strip 1 has a relatively small thermal mass and/or conductivity. Thus, by locating the contact 12 at a greater distance from the weld point, the tube 2 receives greater heating than the strip 1. The contact 12 may have a different shape, but as illustrated in FIG. 3, it may have shape which causes the contact 12 to engage the tube 2 over about ¼ of the periphery of the tube 2.

Also, if the tube 2 has a larger thermal mass, and the contact 12 has a greater spacing from the weld point than the contact 10, it is desirable to provide a proximity conductor 13 which serves to concentrate heating current at the lowermost portion of the tube 2. Although the proximity conductor can be connected to the contact 10 at one end and connected to the lead 11 at its opposite end so that the proximity conductor 13 is in electrical series between the lead 11 and the contact 10, it is preferred that the proximity conductor 13 be connected as shown. Thus, the proximity conductor 13 is connected at its left end, as viewed in FIG. 1, to the contact 12 and extends from such contact 12 to adjacent, but in spaced relation with, the contact 10. The right end conductor 13 has an extension 14 which is contacted by a lead 15 connected to the high frequency source. The contact 12 and the conductor 13 are supported by insulating means in a known manner in the position shown in FIGS. 1 and 3, and the conductor 13 may be a copper tube through which cooling water is circulated as indicated by the arrows 16 and 17.

It has been found that when the strip 1 is relatively thin and flexible it will vibrate or oscillate as it moves from underneath the contact 10 to the weld point W unless it is constrained to follow a fixed path from a contact 10 to the weld point W. As it is known in the art, the concentration of the current at the lower side of the tube 2 and the upper surface of the strip 1, will vary with variations in the spacing between the upper face of the strip 1 and the lower part of the tube 2 which means that the amount of heating of the tube 2 and the strip 1 by the time that they reach the weld point W will vary. Variations in the heating will cause non-uniform welds between the tube 2 and the strip 1.

In accordance with the invention, the diameter of the roll 5, which is made of a rigid material, e.g. steel, ceramic, etc., is selected so that if the strip 1 is held tightly against the portion of the periphery of the roll 5, which extends from the contact 10 to the weld point W, the strip will follow a fixed path, in its movement from the contact 10 to the weld point W. To maintain the strip 1 against such portion of the roll 5, tension force directed oppositely to the direction of movement of the strip 1 is applied to the strip 1 in advance of the upstream edge of the contact 10, such force also being directed so that it does not tend to move the contact 10 and the strip 1 away from such portion of the roll 5. In the preferred embodiment of the invention, the strip is held firmly against the periphery of the roll 5 by causing it to engage such periphery through an angle of approximately 180°, as indicated in FIG. 1, and by applying a restraining force to the strip 1 on the portion thereof diametrically opposite to the weld point W. Although such tension may be applied to strip 1 in various manners, it has been found that adequate tension of the strip 1 may be obtained by engaging the strip 1 with a pad 18 of felt or similar material which is in sliding engagement with and pressed against the face of the strip 1. Thus, the pad 18, which has a width somewhat greater than the central portion 19 of the roll 5, presses the strip 1 against the periphery of the roll 5 and because, of the friction between the pad 18 and the strip 1, tension is applied to the strip 1 in a direction opposite to the direction of advance of the strip 1 toward the weld point W.

The material of the pad 18, the area of the engaging surfaces of the pad 18 and the strip 1 and the pressure applied to the pad 18 urging it toward the strip 1 which are required are determined by trial and error, but, for example, a pad 18 of medium hard felt which provides a control area of approximately three square inches with the strip 1 and which is pressed toward the strip 1 with a pressure of approximately 15 pounds has been found to be satisfactory for use with aluminum or copper strip 1. Of course, the friction force applied to the strip 1 should not be greater than necessary or large enough to tear or rip the strip 1, and preferably, the force and the material of the pad 18 should be such as to avoid marring of the surface of the strip 1.

Although, the roll 5 may be in the shape of a cylinder, it has been found that the strip 1 will better follow the periphery of the roll 5, without excessive sidewise movement, if the diameter of the roll 5 varies from a larger diameter centrally of the axial width thereof to a smaller diameter at axially opposite ends thereof as illustrated in FIG. 2. Thus, the central portion 19 of the roll 5 has the largest diameter, and has a width at least equal to the width of the weld 20, and the diameter of the roll 5 tapers gradually to a smaller diameter at the axially opposite ends of the roll 5. Preferably, the width of the roll 5, between its axially opposite ends, is at least equal to the width of the strip 1.

Of course, other conventional equipment, such as guide rolls for the tube 2 and for the strip 1, will normally be used in advance of the apparatus as shown in FIG. 1. It has been found that with the apparatus and method of the invention a continuous longitudinally uniform weld between the tube 2 and the strip 1 having a width equal to a small fraction of the circumferential dimension of the tube 2 may be produced at relatively high speeds. Although the tube 2 is centrally disposed with respect to the width of the strip 1, the tube 2 may be welded to the strip 1 in a different position by changing the position of the tube 2 with respect to the width of the strip 1 and preferably also, changing the position of the pad 18 so that it is aligned with the weld point circumferentially of the roll 15.

The apparatus and method of the invention are also useful for the welding together of a pair of thin, flexible metal strips with a longitudinally uniform weld. As illustrated in FIGS. 5 and 6, the metal strip 1 advances to the weld point W and is held against the periphery of the roll 5 as described in connection with FIGS. 1 and 2. A second metal strip 1a is similarly advanced to the weld point W and is held against the periphery of a modified roll 5a. Heating current is supplied to the strips 1 and 1a by a pair of contacts 10 and 10c which respectively engage the surfaces of the strips 1 and 1a upstream of the weld point W.

As known in the art, the high frequency electric currents, which are oppositely flowing between the contacts 10 and 10a and the weld point, will be concentrated on the surfaces approaching the weld point W which are nearest each other. If the surfaces are flat, i.e. lie in parallel planes, the currents will be relatively widely distributed requiring impractically large heating currents and producing variable heating across the width of the parts and erractic welds. However, if one or both of the surfaces is shaped so that a narrow portion of a surface is nearer to the other surface, the heating currents will be concentrated in such portion and the immediately adjacent portion of the other surface thereby reducing the magnitude of the current required for welding and the width of the weld. For these reasons, the strip 1a may be shaped as shown in FIG. 6 to have a central portion 21 with its surface nearer to the surface of the strip 1 than the remainder of the surface of the strip 1a. The central portion 19a of the roll 5a is also shaped to mate with the portion 21 of the strip 1a. Although the portion 21 preferably is arcuate in cross section, the cross section may be of a different shape.

The strip 1a may be provided with the shaped central portion 21 by conventional means prior to the time it reaches the roll 5a, or if the strip 1a is sufficiently thin and formable, the strip 1a may be caused to conform to the projecting portion 19a of the roll 5a by means of the pad 18.

Although it is necessary to provide only one of the strips, 1 or 1a, with a shaped portion 21, both of the strips 1 and 1a may have a shaped portion 21, either of the same or different shape. If the shape of both portions is as shown in FIG. 6, roll 5 may be the same as roll 5a.

It will be observed from an examination of FIG. 5 that a straight line intersecting the axes 6 and 6a of the rolls 5 and 5a passes through the weld point W at which the portion 21 of the strip 1a is pressed against the strip 1 by the rolls 5 and 5a to form a weld 20.

With the apparatus shown in FIGS. 5 and 6, a continuous, longitudinally uniform, relatively narrow weld 20 may be produced between a pair of relatively thin, flexible metal strips at relatively high speeds. Although the weld 20 is centrally disposed with respect to the width of the strips 1 and 1a in the embodiment shown in FIGS. 5 and 6, the weld 20 may be disposed other than centrally of the widths thereof by changing the positions of the portion 20, the portion 19a, and the pad 18a to the desired positions with respect to the width of the sheets 1 and 1a.

Although the preferred embodiments of the present invention have been described and illustrated, it will be apparent to those skilled in the art that various modifications may be made without departing from the principles of the invention.

What is claimed is:

1. A method for welding a thin, flexible, metal strip to a metal part along a line extending longitudinally of the strip using high frequency electric current to heat the surfaces of the part and the strip to be joined to welding temperature, said strip having a face between its longitudinal edges which is large in width relative to its thickness and having a thickness which permits it to undulate in a direction perpendicular to said face in the absence of support therefor, and said part having a longitudinal surface portion which is narrower than said face, said method comprising:

continuously advancing said metal part toward a weld point;

continuously advancing said strip toward said weld point and into contact with said part at said weld point and with said face thereof facing said portion of said part and, in advance of said weld point, maintaining the strip spaced from said part so that a narrow V-shaped gap is present between said strip and said portion of said part in advance of said weld point;

supplying high frequency electric current to said part and said strip at points thereon in advance of said weld point by means of a first contact engaging said part at a first point which is in advance of said weld point and which is at the upstream end of one side of said gap, a second contact engaging said strip at a second point which is in advance of said weld point and which is at the upstream end of the other side of said gap to heat the portions of the surfaces of the strip and the part which are nearest each other to welding temperature by the time they reach said weld point;

constraining said strip to a fixed path which is said other side of said V-shaped gap from said second point to said weld point by engaging said strip from said second point to adjacent said weld point and at the side thereof opposite to said face with a rigid member having the path shape of said other side of V-shaped gap and applying a force to said strip directed so as to maintain said strip against said member and to substantially prevent movement of said strip toward or away from said metal part during its passage from said second point to said weld point; and pressing said strip and said portion of said part together at said weld point to form a weld therebetween.

2. A method as set forth in claim 1 wherein said rigid member is a rotatable roll having a diameter such that the portion of said roll which engages said strip between said second point and said weld point causes the strip to follow an arcuate path between said second point and said weld point and said strip is constrained by engaging it with and maintaining it against the periphery of said roll.

3. A method as set forth in claim 2 wherein said roll is positioned so that its periphery is adjacent said weld point and so that it presses said strip against said part at said weld point to form said weld therebetween.

4. A method as set forth in claim 1 wherein said force is applied to said strip by frictionally engaging said face thereof in advance of said second point with a pad which presses said strip against said roll in advance of said second point.

5. A method as set forth in claim 1 wherein said part is metal tube and wherein the heating of said metal tube is increased with respect to the heating of said strip by engaging said tube with said first contact at a said first point which is farther from said weld point than said second point and supplying the electric current to said first contact through a proximity conductor which extends from adjacent said second contact to said first contact in closely spaced relation to said tube and which is intermediate said tube and said strip.

6. A method as set forth in claim 1 wherein said metal part is a further thin, flexible, metal strip which has a face between its edges which is large in width relative to its thickness and having a thickness which permits it to undulate in a direction perpendicular to said face during the welding and in the absence of support therefor, and wherein said method further comprises:

forming at least one of the strips in advance of the point where it is contacted by a contact so that a portion of the strip which extends lengthwise of the strip and which is narrow relative to the width of the strip is raised above the face of the strip, the remainder of the face lying substantially in a flat plane;

continuously advancing said further strip toward the weld point with its face facing the face of the other strip; and constraining said further strip to a fixed path which is said one side of said V-shaped gap from said first point at which it is engaged by the first contact to said weld point by engaging said further strip, from said first point to adjacent said weld point and at the side thereof opposite to said face of said further strip, with a rigid member having the path shape of said one side of said gap and applying a force to said further strip directed so as to maintain said further strip against said last-mentioned member and to substantially prevent movement of said further strip toward or away from said first-mentioned strip during the passage of said further strip from said first point to said weld point.

7. A method as set forth in claim 6 wherein said rigid member which engages said first-mentioned strip is a first rotatable roll and said rigid member which engages said further strip is a second rotatable roll, said first roll and said second roll being disposed so that a straight line inter-connecting their axes of rotation passes substantially through said weld point and said first roll and said second roll having diameters such that the portions thereof which engage said first-mentioned strip and said further strip between the contact engaging a strip and the weld point causes each strip to follow an arcuate path between the contact engaging a strip and the weld point and wherein said first roll and said second roll are positioned so that they press said first-mentioned strip and said further strip together at the weld point to form said weld therebetween.

8. A method as set forth in claim 7 wherein one of said first roll and said second roll is shaped to form the strip which it engages and the latter strip is pressed against said one roll in advance of the contact which engages the latter strip.

9. Apparatus for welding a thin, flexible, metal strip to a metal part along a line extending longitudinally of the strip, said strip having a face between its longitudinal edges which is large in width relative to its thickness and having a thickness which permits it to undulate in a direction perpendicular to said face during the welding and in the absence of support therefor and said part having a longitudinal surface portion which is narrower than said face, said apparatus comprising:

means for advancing said part along a first path toward a weld point;

means for advancing said strip toward said weld point with said face of said strip facing said portion of said part and with the portions of said face, other than any longitudinal portion thereof which is narrow relative to the width of said face, lying substantially in a flat plane;

first contact means for engaging said part at a first point in advance of and spaced from said weld point;

second contact means for engaging said strip at a second point in advance of and spaced from said weld point;

means for supplying high frequency electric current to said first contact and said second contact;

a rigid member extending at least from adjacent said second contact means to adjacent said weld point for engaging the face of said strip opposite from said first-mentioned face thereof and guiding said strip along a second path extending from said second contact to said weld point and without substantial movement toward or away from said part, said second path lying substantially in a plane which is common to said first path and said second path and said second path extending at a small angle to said first path so that a V-shaped gap is present between said strip and said part in advance of said weld point;

means for applying force to said strip in a direction which maintains said strip against said rigid member during its passage from said second contact to said weld point; and means for pressing said part and said strip together at said weld point.

10. Apparatus as set forth in claim 9 wherein said rigid member is a rotatable roll positioned so that its periphery is engageable with said strip from said second point to said weld point for guiding said strip along an arcuate said second path.

11. Apparatus as set forth in claim 10 wherein said means for applying force to said strip comprises means frictionally engageable with said strip and pressing said strip against said roll.

12. Apparatus as set forth in claim 11 wherein said means for pressing said strip and said part together at the weld point comprises a further rotatable roll engageable with said part at said weld point.

13. Apparatus as set forth in claim 10 wherein said roll has a periphery of varying diameter, a portion of said roll spaced from its axial ends having the largest diameter.

14. Apparatus as set forth in claim 13 wherein said portion of said roll is raised above adjacent portions of the periphery of said roll.

15. Apparatus as set forth in claim 14 wherein said portion of said roll has an arcuate surface in a section taken axially of said roll.

16. Apparatus as set forth in claim 13 wherein said means for pressing said strip and said part together comprises a further rotatable roll engageable with said part at said weld point.

17. Apparatus as set forth in claim 16 wherein said further rotatable roll has a peripheral groove for receiving said part.

18. Apparatus as set forth in claim 16 wherein further roll has a periphery of varying diameter, a portion of said roll spaced from its axial ends having the largest diameter.

19. Apparatus as set forth in claim 9 wherein said means for supplying high frequency current comprises a proximity conductor connected at one end to said first contact and extending to adjacent said second contact in closely spaced relation to said first path and disposed intermediate said first path and said second path.

* * * * *